United States Patent
D'Andre

(10) Patent No.: US 11,955,001 B2
(45) Date of Patent: Apr. 9, 2024

(54) TRAFFIC NEAR MISS COLLISION DETECTION

(71) Applicant: GridMatrix, Inc., Cupertino, CA (US)

(72) Inventor: Nicholas D'Andre, Los Angeles, CA (US)

(73) Assignee: GridMatrix, Inc., Cupertino, CA (US)

(*) Notice: Subject to any disclaimer, the term of this patent is extended or adjusted under 35 U.S.C. 154(b) by 0 days.

(21) Appl. No.: 17/861,411

(22) Filed: Jul. 11, 2022

(65) Prior Publication Data

US 2023/0098483 A1 Mar. 30, 2023

Related U.S. Application Data

(60) Provisional application No. 63/320,010, filed on Mar. 15, 2022, provisional application No. 63/318,442,
(Continued)

(51) Int. Cl.
*G08G 1/01* (2006.01)
*G06V 10/764* (2022.01)
(Continued)

(52) U.S. Cl.
CPC ......... *G08G 1/0125* (2013.01); *G06V 10/764* (2022.01); *G06V 20/46* (2022.01);
(Continued)

(58) Field of Classification Search
CPC .. G08G 1/0125; G08G 1/0116; G08G 1/0133; G08G 1/052; G06V 20/46; G06V 20/54; G06V 10/764; G06V 2201/08
(Continued)

(56) References Cited

U.S. PATENT DOCUMENTS 6,810,132 B1 10/2004 Umezaki et al.
2006/0055525 A1* 3/2006 Kubota ................. G08G 1/167
340/425.5
(Continued)

FOREIGN PATENT DOCUMENTS

WO WO 2021/061488 A1 4/2021
WO WO 2021/073716 A1 4/2021
WO WO 2022/040610 A1 2/2022

OTHER PUBLICATIONS

International Search Report and Written Opinion for International Application No. PCT/US2022/044733 dated Jan. 5, 2023, 15 pages.
(Continued)

*Primary Examiner* — Kerri L McNally
*Assistant Examiner* — Thang D Tran
(74) *Attorney, Agent, or Firm* — Brownstein Hyatt Farber Schreck, LLP

(57) ABSTRACT

One or more devices may obtain traffic data, such as video from intersection cameras, point cloud data from Light Detection and Ranging (or "LiDAR") sensors, and so on. Metrics may be calculated from the traffic data. For each frame, the metrics may be analyzed to detect whether a near miss/collision occurs between each object in the frame (such as motorized or non-motorized vehicles, pedestrians, and so on) and each of the other objects in the frame. These metrics may be analyzed to evaluate whether or not a group of conditions are met. If the group of conditions are met, a near miss/collision may be detected. This may be recorded in the metrics for the objects involved. In some implementations, one or more indicators may be added to the traffic data and/or to one or more visualizations generated using the metrics, the traffic data, the structured data, and so on.

20 Claims, 9 Drawing Sheets

Related U.S. Application Data filed on Mar. 10, 2022, provisional application No. 63/315,200, filed on Mar. 1, 2022, provisional application No. 63/248,948, filed on Sep. 27, 2021.

(51) Int. Cl.
    *G06V 20/40*     (2022.01)
    *G06V 20/54*     (2022.01)
    *G08G 1/052*     (2006.01)

(52) U.S. Cl.
    CPC .......... *G06V 20/54* (2022.01); *G08G 1/0116* (2013.01); *G08G 1/0133* (2013.01); *G08G 1/052* (2013.01); *G06V 2201/08* (2022.01)

(58) Field of Classification Search
    USPC ......................................................... 340/936
    See application file for complete search history.

(56) References Cited

U.S. PATENT DOCUMENTS

| | | | | |
|---|---|---|---|---|
| 2008/0069402 | A1* | 3/2008 | Dhua | G06V 20/58 382/104 |
| 2013/0063257 | A1* | 3/2013 | Schwindt | G01S 13/867 340/425.5 |
| 2015/0025789 | A1* | 1/2015 | Einecke | B60W 40/04 701/408 |
| 2015/0145701 | A1 | 5/2015 | Beggs et al. | |
| 2015/0228066 | A1* | 8/2015 | Farb | G06V 20/58 348/148 |
| 2016/0341555 | A1* | 11/2016 | Laur | G08G 1/164 |
| 2017/0057496 | A1* | 3/2017 | Toyoda | G05D 1/0289 |
| 2018/0025636 | A1* | 1/2018 | Boykin | G08G 1/096725 701/1 |
| 2018/0089515 | A1* | 3/2018 | Yang | G06V 20/54 |
| 2018/0160333 | A1* | 6/2018 | Patil | H04W 28/0236 |
| 2018/0190111 | A1* | 7/2018 | Green | G08G 1/0133 |
| 2018/0222473 | A1* | 8/2018 | Shami | B60W 50/14 |
| 2018/0253973 | A1* | 9/2018 | Yang | G06V 20/58 |
| 2019/0311494 | A1* | 10/2019 | Ramalingam | G06F 18/2413 |
| 2020/0026289 | A1* | 1/2020 | Alvarez | G07C 5/085 |
| 2020/0076878 | A1* | 3/2020 | Whited | G06F 16/29 |
| 2020/0156538 | A1* | 5/2020 | Harper | G10K 11/34 |
| 2020/0262377 | A1* | 8/2020 | Salter | B60Q 1/2661 |
| 2020/0274311 | A1* | 8/2020 | Shand | G05D 1/0278 |
| 2020/0285235 | A1* | 9/2020 | Yamane | B60W 10/20 |
| 2020/0342235 | A1* | 10/2020 | Tsai | G06V 10/82 |
| 2020/0342242 | A1* | 10/2020 | Avidan | G08G 1/165 |
| 2020/0388150 | A1* | 12/2020 | Herson | G06V 20/54 |
| 2020/0388156 | A1 | 12/2020 | Aoude et al. | |
| 2020/0409912 | A1* | 12/2020 | Dong | G06V 10/764 |
| 2021/0006960 | A1* | 1/2021 | Martin | G01C 21/16 |
| 2021/0012663 | A1* | 1/2021 | Cooper | G08G 1/166 |
| 2021/0065551 | A1* | 3/2021 | Manohar | G08G 1/04 |
| 2021/0118303 | A1* | 4/2021 | Chan | G08G 1/166 |
| 2021/0166558 | A1* | 6/2021 | Giraud | G08G 1/0133 |
| 2021/0197720 | A1* | 7/2021 | Houston | G06N 3/045 |
| 2021/0201501 | A1* | 7/2021 | Yuan | G06V 10/82 |
| 2021/0225008 | A1* | 7/2021 | Yamamoto | G06V 10/454 |
| 2021/0304617 | A1* | 9/2021 | Ahire | G06V 40/20 |
| 2021/0347378 | A1* | 11/2021 | Nabatchian | G06F 18/214 |
| 2021/0374412 | A1* | 12/2021 | Cerri | G06V 20/56 |
| 2022/0051566 | A1* | 2/2022 | Hui | G08G 1/052 |
| 2022/0058399 | A1* | 2/2022 | Neser | G06V 20/54 |
| 2022/0135029 | A1* | 5/2022 | Poubel Orenstein | B60W 60/00276 701/301 |
| 2023/0054974 | A1* | 2/2023 | Baig | B60W 40/04 |

OTHER PUBLICATIONS

International Search Report and Written Opinion for International Application No. PCT/US2022/044748 dated Jan. 4, 2023, 15 pages.

* cited by examiner

TRAFFIC NEAR MISS COLLISION DETECTION

CROSS-REFERENCE TO RELATED APPLICATIONS

This application is a nonprovisional and claims the benefit under 35 U.S.C. § 119(e) of U.S. Provisional Patent Application No. 63/248,948, filed Sep. 27, 2021, titled "Traffic Monitoring, Analysis, and Prediction;" U.S. Provisional Patent Application No. 63/315,200, filed Mar. 1, 2022, titled "Simulation of a Digital Twin Intersection with Real Data;" U.S. Provisional Patent Application 63/318,442, filed Mar. 10, 2022, titled "Traffic Near Miss Detection;" and U.S. Provisional Patent Application No. 63/320,010, filed Mar. 15, 2022, titled "Traffic Near Miss/Collision Detection;" the contents of which are incorporated herein by reference as if fully disclosed herein.

FIELD

The described embodiments relate generally to traffic analysis. More particularly, the present embodiments relate to traffic near miss/collision detection.

BACKGROUND

All population areas experience traffic. Traffic may be motorized, non-motorized, and so on. Traffic may include cars, trucks, pedestrians, scooters, bicycles, and so on. Traffic appears to only increase as the population of the world continues to increase.

Some population areas, such as cities, use cameras and/or other traffic monitoring devices to capture data about traffic. This data may be used to evaluate congestion, traffic signal configurations, road layout, and so on.

SUMMARY

The present disclosure relates to traffic near miss/collision detection. Traffic data may be obtained, such as video from intersection cameras, point cloud data from Light Detection and Ranging (or "LiDAR") sensors, and so on. Object detection and classification may be performed using the data, and structured data may be determined and/or output using the detected and classified objects. Alternatively, structured data may be obtained that has been generated by performing such object detection and classification on traffic data (such as point cloud data from LiDAR sensors). Metrics may be calculated using the structured data. For each frame of traffic data, the metrics may be analyzed to detect whether a near miss/collision occurs between each object in the frame (such as motorized or non-motorized vehicles, pedestrians, and so on) and each of the other objects in the frame. These metrics may be analyzed to evaluate whether or not a group of conditions are met. If the group of conditions are met, a near miss/collision may be detected. This may be recorded in the metrics for the objects involved. In some implementations, one or more indicators may be added to the traffic data and/or to one or more visualizations generated using the metrics, the traffic data, the structured data, and so on.

In various embodiments, a system includes a memory allocation configured to store at least one executable asset and a processor allocation configured to access the memory allocation and execute the at least one executable asset to instantiate a near miss/collision detection service. The near miss/collision detection service detects objects in a frame, analyzes pairs of the objects, determines that a group of conditions are met, and determines that a near miss/collision has occurred.

In some examples, the group of conditions includes that a distance between an object pair of the pairs of the objects is less than a distance threshold. In a number of implementations of such examples, the distance threshold is approximately 7 feet. By way of illustration, approximately 7 feet may be within 6-8 feet.

In various examples, the group of conditions includes that a speed of an object of an object pair of the pairs of the objects is greater than a speed threshold. In some implementations of such examples, the speed threshold is approximately zero miles per hour. By way of illustration, approximately zero may be within 1 mile per hour of zero.

In a number of examples, the group of conditions includes that an angle between an object pair of the pairs of the objects is higher than an angle threshold. In some implementations of such examples, the angle threshold is approximately 12 degrees. By way of illustration, approximately 12 degrees may be within 11-13 degrees.

In various examples, the group of conditions includes that an object pair of the pairs of the objects are not both coming from a same approach. In some implementations, the group of conditions includes that one of an object pair of the pairs of the objects was not previously determined to be involved in another near miss/collision. In a number of implementations, the group of conditions includes that a sum of previous speeds is higher than zero for both of an object pair of the pairs of the objects.

In some examples, the group of conditions includes a first group of conditions for a first object pair of the pairs of the objects that are both vehicles and a second group of conditions for a second object pair of the pairs of the objects that include a vehicle and a pedestrian. In a number of implementations of such examples, the second group of conditions includes a lower distance threshold than the first group of conditions. In various implementations of such examples, the second group of conditions includes no condition related to an angle between the vehicle and the pedestrian. In some implementations of such examples, the second group of conditions includes a higher speed threshold than the first group of conditions and the second group of conditions evaluates the vehicle according to the higher speed threshold.

In a number of examples, the near miss/collision detection service determines a conversion factor between pixels and a speed measurement. In various implementations of such examples, the speed measurement may be in miles per hour. In some examples, the system further includes adding a near miss/collision indicator to the frame.

In some embodiments a method of near miss/collision detection includes obtaining traffic data, analyzing the traffic data, determining that a near miss/collision occurred, and responding to the near miss/collision.

In various examples, responding to the near miss/collision includes determining that the near miss/collision is a collision. In a number of implementations of such examples, the method further includes transmitting an alert regarding the collision.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
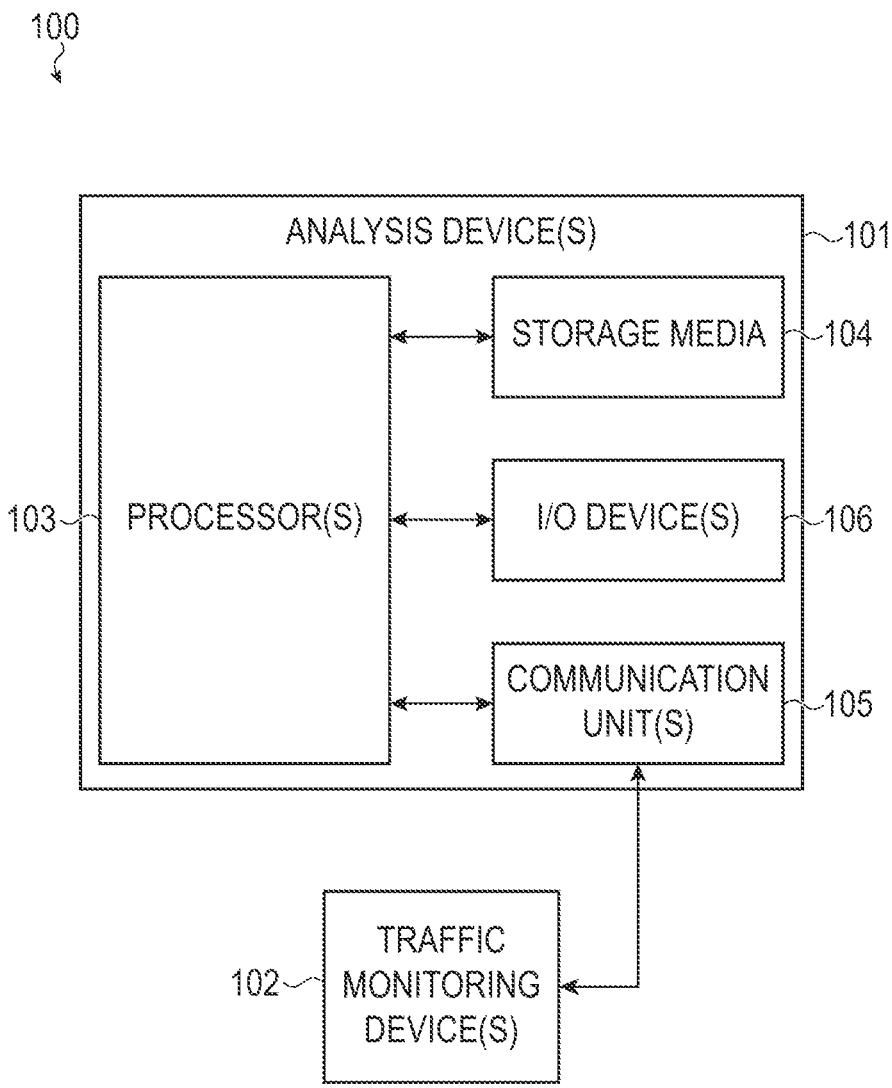
FIG. 1 depicts an example system for traffic near miss/collision detection.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

A near miss may be when two objects (such as motorized or non-motorized vehicles, pedestrians, and so on) in traffic almost collide. A collision may be when the two objects actually collide. Near misses/collisions may signal traffic problems that may need to be addressed. Further, near misses may be more challenging to track than actual collisions as near misses may not be reported to insurance providers, law enforcement, and/or other entities. Data regarding detected near misses/collisions may be useful in the ability to visualize various metrics about the traffic, enable adaptive traffic signal control, predict traffic congestion and/or accidents, and aggregate data from multiple population areas for various uses, such as in the auto insurance industry, rideshare industry, logistics industry, autonomous vehicle original equipment manufacturer industry, and so on.

The following disclosure relates to traffic near miss/collision detection. Traffic data may be obtained, such as video from intersection cameras, point cloud data from Light Detection and Ranging (or "LiDAR") sensors, and so on. Object detection and classification may be performed using the data, and structured data may be determined and/or output using the detected and classified objects. Alternatively, structured data may be obtained that has been generated by performing such object detection and classification on traffic data (such as point cloud data from LiDAR sensors). Metrics may be calculated using the structured data. For each frame of traffic data, the metrics may be analyzed to detect whether a near miss/collision occurs between each object in the frame (such as motorized or non-motorized vehicles, pedestrians, and so on) and each of the other objects in the frame. These metrics may be analyzed to evaluate whether or not a group of conditions are met. If the group of conditions are met, a near miss/collision may be detected. This may be recorded in the metrics for the objects involved. In some implementations, one or more indicators may be added to the traffic data and/or to one or more visualizations generated using the metrics, the traffic data, the structured data, and so on.

In this way, the system may be able to perform near miss/collision detection and/or various other actions based thereon that the system would not previously have been able to perform absent the technology disclosed herein. This may enable the system to operate more efficiently while consuming fewer hardware and/or software resources as more resource consuming techniques could be omitted. Further, a variety of components may be omitted while still enabling traffic near miss detection, reducing unnecessary hardware and/or software components, and providing greater system flexibility.

These and other embodiments are discussed below with reference to FIGS. 1-5E. However, those skilled in the art will readily appreciate that the detailed description given herein with respect to these Figures is for explanatory purposes only and should not be construed as limiting.

FIG. 1 depicts an example system 100 for traffic near miss/collision detection. The system 100 may include one or more analysis devices 101 (which may be implemented using one or more loud computing arrangements) and/or one or more traffic monitoring devices 102 (such as one or more intersection and/or other still image and/or video cameras, LiDAR sensors, loops, radar, weather data, Internet of Things sensors, fleet vehicles, traffic controllers and/or other city and/or other population area supplied data devices, navigation app data, connected vehicles, and so on).

The analysis device 101 and/or one or more other devices may obtain traffic data (such as video from intersection cameras, point cloud data from Light Detection and Ranging (or "LiDAR") sensors, and so on) from the traffic monitoring device. The analysis device 101 and/or one or more other devices may perform object detection and classification using the data and may determine an output structured data using the detected and classified objects. Alternatively, the analysis device 101 and/or one or more other devices may obtain structured data that has been generated by performing such object detection and classification on traffic data (such as point cloud data from LiDAR sensors). The analysis device 101 and/or one or more other devices may calculate one or more metrics using the structured data. For each frame of traffic data, the analysis device 101 and/or one or more other devices may analyze the metrics to detect whether a near miss/collision occurs between each object in the frame (such as motorized or non-motorized vehicles, pedestrians, and so on) and each of the other objects in the frame. The analysis device 101 and/or one or more other devices may analyze the metrics to evaluate whether or not a group of conditions are met. If the group of conditions are met, the analysis device 101 and/or one or more other devices may determine that a near miss/collision is detected. The analysis device 101 and/or one or more other devices may record the near miss/collision and/or other data based thereon in the metrics for the objects involved. In some implementations, analysis device 101 and/or one or more other devices may add one or more indicators to the traffic data and/or to one or more visualizations generated using the metrics, the traffic data, the structured data, and so on.

The group of conditions may include a variety of factors, such as the distance between the objects, the direction of movement of the objects, the current speed of the objects, and so on.

In some implementations, a near miss/collision may be detected between a pair of objects when the distance between them is below a distance threshold, the speed of at least one of the objects is higher than a speed threshold, the angle between the vehicles is higher than an angle threshold, the objects are not coming from the same approach (intersection entrance), at least one of the vehicles was not detected in a near miss already in the same traffic data, and the sum of previous speeds of each of the objects is higher than zero (avoiding parked and/or otherwise stationary objects). Near misses/collisions may be calculated in a metrics module and analyzed for every frame. A near miss/collision detection process may include detecting objects in a given frame, making a list of all objects in that frame, analyzing all possible pairs of objects in that frame and, if the group of conditions above are met, determine that a near miss/collision is detected. After a near miss/collision is detected, both objects may be marked as having been involved in a near miss/collision.

In various implementations, only portions of the traffic data may be analyzed for near misses/collisions. For example, most near misses/collisions may happen within actual intersections between objects of opposing directions. Further, 40% of near misses/collisions may happen with left turns, either a left turn or an exit approach. As such, near miss/collision detection analysis may be restricted to objects within intersections of opposing directions, objects involved in left turns, and so on.

Accuracy of near miss/collision detection may depend on the traffic monitoring device 102, the angle to the intersection, and so on. Performance of near miss/collision detection may be evaluated using a near miss/collision data set (traffic data with a near miss/collision) and a number of different performance measurements. These performance measurements may include recall (the number of near misses/collisions detected over the total number of near misses/collisions), precision (the number of near misses/collisions over the total number of possible pairs of objects in the data set), and so on.

Near misses/collisions may be detected and data stored for such at the frame level. Alternatively and/or additionally, near misses/collisions may be detected and data stored for such at a second level above the frame level, such as a group of frames. This may reduce the amount of data that may be stored.

Latency of near miss/collision detection may be approximately equal to the latency of the system 100. This may relate to the time that passes between ingestion of traffic data and processing of a frame.

In some implementations, a near miss/collision detection procedure may be run every frame, along with other relevant metrics. Such a near miss/collision detection procedure may involve the following steps. The near miss/collision detection procedure may start with object detection and tracking in the frame under analysis. The output of this process may be a list of record keys identifying each object, bounding boxes pointing to the object's position, class, the total number of frames that the object has appeared in so far (age), the number of frames that have passed since the object has been detected for the last time (time_since_update), and so on. The second step may involve going through this list of objects and processing a group of metrics calculations that involve the near miss/collision detection. These metrics may be calculated on the base of each object. For each object, the following metrics may be calculated that may play a role in the detection of near misses/collisions: direction angle (direction of the object's movement), conversion factor between pixels and miles, speed in miles per hour (or kilometers per hour and/or other measure), approach ID (identifier), intersection entrance, or where the object is coming from. With regards to direction angle, changes in position and previous value of direction angle may be used to calculate the direction of the object and exclude outlier values (such as erroneous values). With regards to the conversion factor, the direction angle of the object within its bounding box may be used to obtain the longitudinal size of the object in pixels. Then, the average size of the object class (such as vehicle class) may be used to get a conversion factor between pixels and miles (or other measurement) for that object in the frame. For example, cars in the United States measure on average 14.7 feet long. With regards to speed in miles per hour (or kilometers per hour and/or other measure), the distance in pixels travelled between the current and last frame may be measured. Then this may be multiplied by the conversion factor to get the distance in miles. Finally, the distance may be divided by the time between frames to get the speed in miles per hour. With regards to approach ID, when an object appears in the traffic data, its distance to all approach center points may be calculated and the closest approach may be attributed to the object. Following the calculation of the metrics mentioned above, a near miss detection determination may be applied as follows. For each object, the distance in pixels to all other objects may be measured and transformed into miles (and/or other measurement) using the conversion factor calculated previously. The conversion factor may only allow calculation of distance in miles correctly for objects that are close to each other, as near miss analysis targets are. For each object, the angle with all other objects may be calculated using the direction angle. Then, a group of conditions may be evaluated for every possible pair with the object under analysis. If the group of conditions are all met, the case may be determined to be a near miss. The groups of conditions may be different for different objects, such as between two vehicles, between a vehicle and a pedestrian, and so on.

For example, the group of conditions for detecting a near miss/collision between two vehicles may be as follows. The second vehicle may be required to be at a distance lower than a threshold distance, such as 7 feet. Both vehicles may be required to have speed values higher than a speed threshold, such as 0 miles per hour. The angle between the vehicles may be higher than an angle threshold, such as 12 degrees. The second vehicle may be required to be coming from a different approach than the vehicle under analysis.

By way of another example, the group of conditions to detect a near miss/collision between a vehicle and a pedestrian may be the same as the above with the following exceptions. The person may need to be at a distance lower than a pedestrian distance threshold, such as 5 feet. There may be no conditions related to angles between objects for detecting a near miss/collision between a vehicle and a pedestrian. The vehicle may be required to have a speed higher than a vehicle speed threshold, such as 0.3 miles per hour.

The analysis device 101 and/or one or more other devices may perform object detection and classification using the data. For example, objects may be detected and classified as cars, trucks, buses, pedestrians, light vehicles, heavy vehicles, non-motor vehicles, and so on. Objects may be assigned individual identifiers, identifiers by type, and so on. The analysis device 101 and/or one or more other devices may determine and/or output structured data using the detected and classified objects. The analysis device 101 and/or one or more other devices may calculate one or more metrics using the structured data. For example, the metrics may involve vehicle volume, vehicle volume by vehicle type, average speed, movement status, distance travelled, queue length, pedestrian volume, non-motor volume, light status on arrival, arrival phase, route through intersection, light times, near misses, longitude, latitude, city, state, country, and/or any other metrics that may be calculated using the structured data.

The analysis device 101 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The analysis device 101 may include one or more processors 103 and/or other processing units and/or controllers, one or more non-transitory storage media 104 (which may take the form of, but is not limited to, a magnetic storage medium; optical storage medium; magneto-optical storage medium; read only memory; random access memory; erasable programmable memory; flash memory; and so on), one or more communication units 105, one or more input and/or output devices 106 (such as one or more displays, speakers, keyboards, mice, track pads, touch pads, touch screens, sensors, printers, and so on), and/or other components. The processor 103 may execute instructions stored in the non-transitory storage medium to perform various functions.

Alternatively and/or additionally, the analysis device 101 may involve one or more memory allocations configured to store at least one executable asset and one or more processor allocations configured to access the one or more memory allocations and execute the at least one executable asset to instantiate one or more processes and/or services, such as one or more near miss and/or collision detection and/or response services, and so on.

Similarly, the traffic monitoring device 102 may be any kind of electronic device. Various configurations are possible and contemplated without departing from the scope of the present disclosure.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Example information can include, but may not be limited to: personal identification information (e.g., names, social security numbers, telephone numbers, email addresses, physical addresses, driver's license information, passport numbers, and so on); identity documents (e.g., driver's licenses, passports, government identification cards or credentials, and so on); protected health information (e.g., medical records, dental records, and so on); financial, banking, credit, or debt information; third-party service account information (e.g., usernames, passwords, social media handles, and so on); encrypted or unencrypted files; database files; network connection logs; shell history; filesystem files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service, are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Although the system 100 is illustrated and described as including particular components arranged in a particular configuration, it is understood that this is an example. In a number of implementations, various configurations of various components may be used without departing from the scope of the present disclosure.

For example, the system 100 is illustrated and described as including the traffic monitoring device 102. However, it is understood that this is an example. In various implementations, the traffic monitoring device 102 may not be part of the system 100. The system 100 may instead communicate with the traffic monitoring device 102. Various configurations are possible and contemplated without departing from the scope of the present disclosure.

Although the above illustrates and describes performance of functions like detection and classification, determination of structured data, and so on, it is understood that this is an example. In various implementations, one or more such functions may be omitted without departing from the scope of the present disclosure.

For example, in some implementations, data that has already been detected and classified may be obtained. Various metrics may be calculated from such, similar to above, which may then be prepared for visualization and/or visualized and/or otherwise used similar to above.

Figure 2:
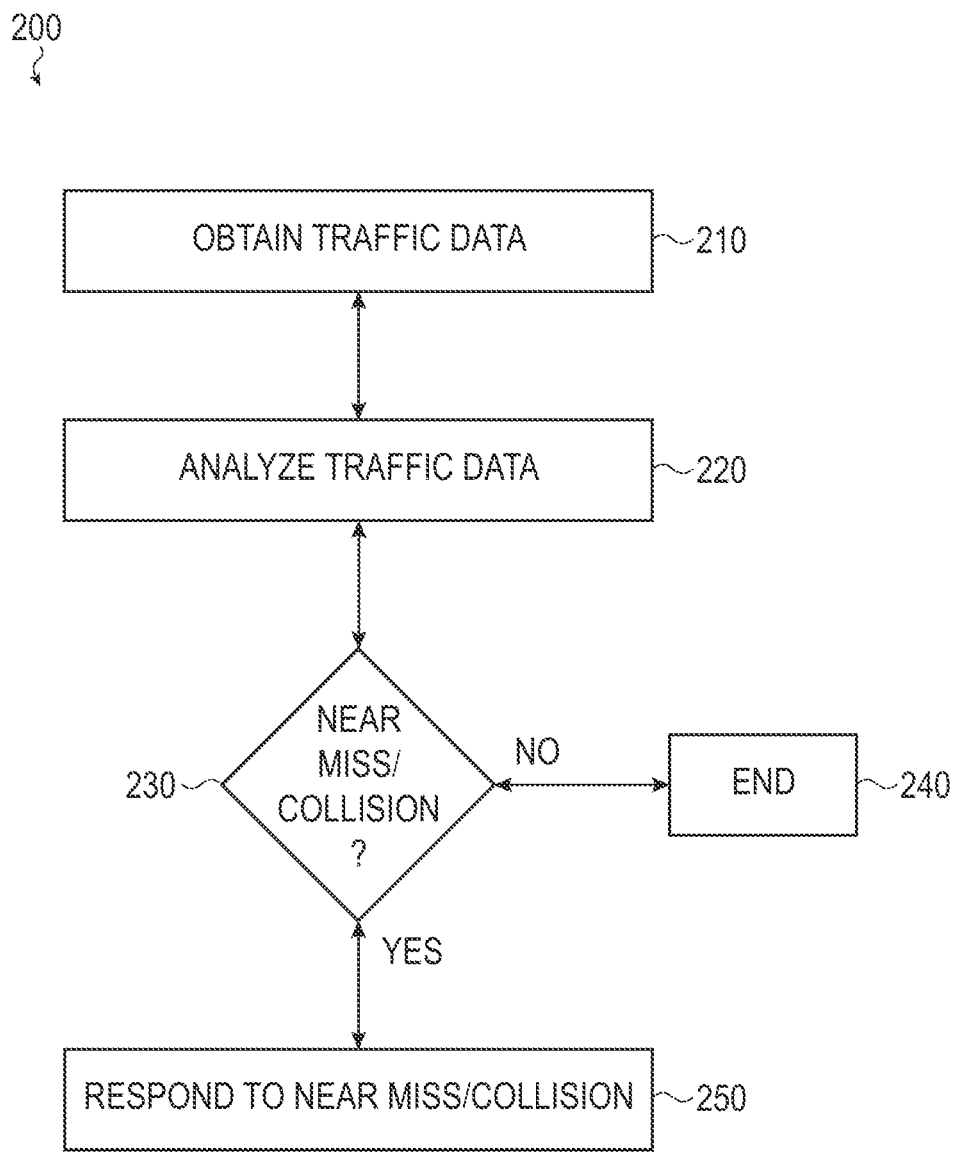
FIG. 2 depicts a flow chart illustrating a first example method for traffic near miss/collision detection. This method may be performed by the system of FIG. 1.

FIG. 2 depicts a flow chart illustrating a first example method 200 for traffic near miss/collision detection. This method 200 may be performed by the system 100 of FIG. 1.

At operation 210, an electronic device (such as the analysis device 101 of FIG. 1) may obtain traffic data, such as video from one or more intersection cameras. At operation 220, the electronic device may analyze the traffic data. At operation 230, the electronic device may determine whether or not a near miss/collision occurred. If not, the flow may proceed to operation 240 and end. Otherwise, at operation 250, the electronic device may respond to the detected near miss/collision. This may include recording data regarding the near miss/collision, marking the traffic data with one or more near miss/collision indicators, transmitting one or more notifications (such as to one or more cities and/or other municipalities or authorities, emergency responders, and so on for the purpose of summoning emergency services, tracking near misses/collisions, and so on), and so on.

In some examples, responding to the detected near miss/collision may include one or more automatic and/or other alerts. By way of illustration, the electronic device may determine within a confidence level, threshold, or similar mechanism that a detected near miss/collision is a collision. In response, the electronic device may automatically and/or otherwise send an alert, such as to a 911 operator and/or other emergency and/or other vehicle dispatcher, emergency and/or other vehicle, vehicle controller, vehicle navigation device, and so on via one or more mechanisms such as cellular and/or other communication network. As such, the collision detection may be external to the vehicle dispatched to render aid and/or perform other actions related to the collision. In some cases, this may add functions to vehicle collision detection systems, add redundancy to vehicle collision detection systems, and so on. The electronic device may also utilize traffic data and/or control other devices, such as to determine the fastest and/or most efficient route to the collision, control traffic signals to prioritize traffic to the collision (such as creating an empty corridor to the collision), and so on. Various configurations are possible and contemplated without departing from the scope of the present disclosure.

In various examples, when the electronic device determines within a confidence level, threshold, or similar mechanism that a detected near miss/collision is a near miss, the electronic device may record the near miss with other traffic data and/or otherwise analyze such as part of analyzing traffic data. Various configurations are possible and contemplated without departing from the scope of the present disclosure.

In various examples, this example method 200 may be implemented as a group of interrelated software modules or components that perform various functions discussed herein. These software modules or components may be executed within a cloud network and/or by one or more computing devices, such as the analysis device 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as including the operation 240. However, it is understood that this is an example. In some implementations, operation 240 may be omitted and the electronic device may instead return to operation 220 and continue analyzing the traffic data. Various configurations are possible and contemplated without departing from the scope of the present disclosure.

Although the above is described in the context of intersection cameras, it is understood that this is an example. In various implementations, other data sources beyond data extracted from intersection video feeds may be used. This may include weather, Internet of Things sensors, LiDAR sensors, fleet vehicles, city suppliers (e.g., traffic controller), navigation app data, connected vehicle data, and so on.

Although the above illustrates and describes performance of functions like detection and classification, determination of structured data, and so on, it is understood that this is an example. In various implementations, one or more such functions may be omitted without departing from the scope of the present disclosure.

For example, in some implementations, data that has already been detected and classified may be obtained. Various metrics may be calculated from such, similar to above, which may then be prepared for visualization and/or visualized and/or otherwise used similar to above.

Figure 3:
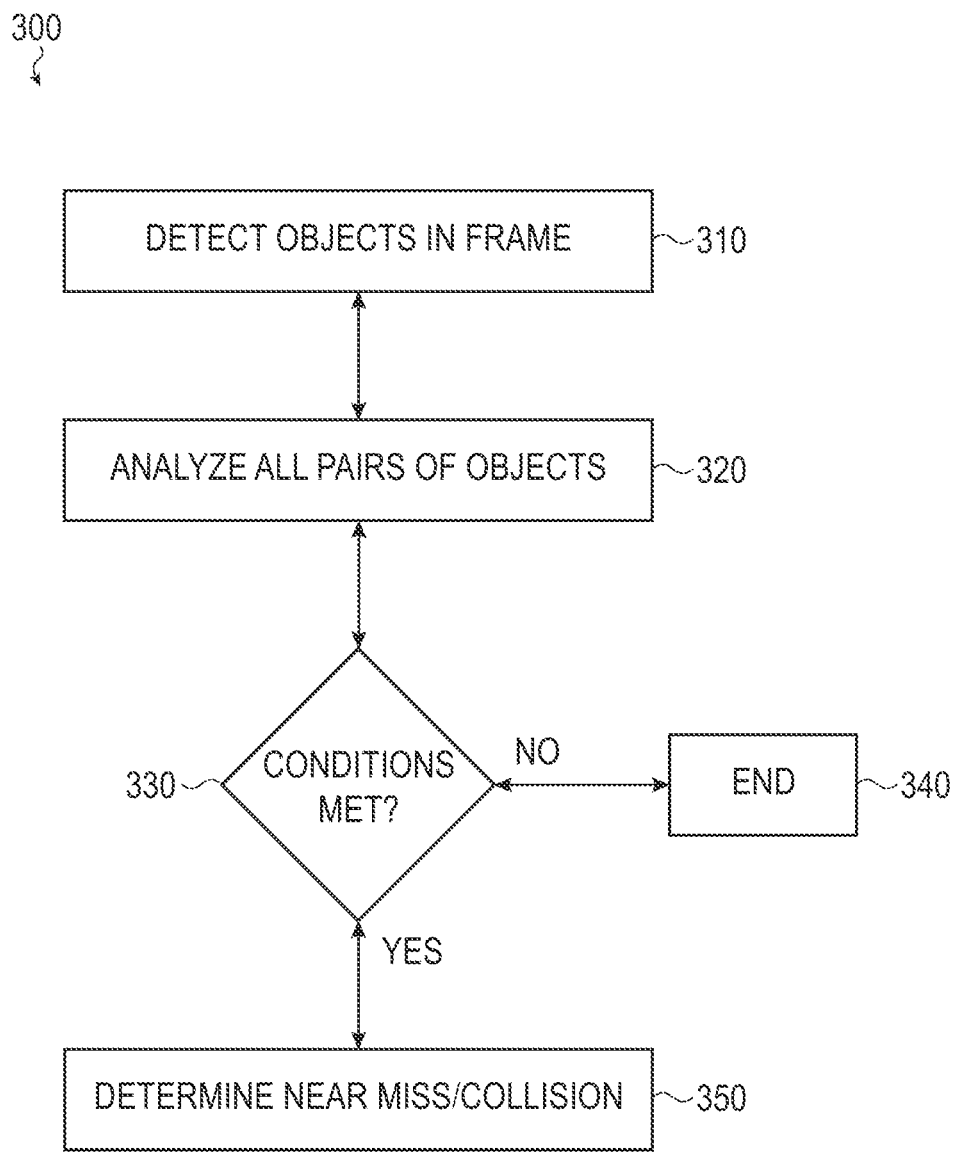
FIG. 3 depicts a flow chart illustrating a second example method for traffic near miss/collision detection. This method may be performed by the system of FIG. 1.

FIG. 3 depicts a flow chart illustrating a second example method for traffic near miss/collision detection. This method may be performed by the system of FIG. 1.

At operation 310, an electronic device (such as the analysis device 101 of FIG. 1) may detect all objects in a frame, such as in frames of a video from one or more intersection cameras. At operation 320, the electronic device may analyze all pairs of objects. At operation 330, the electronic device may determine whether or not a group of conditions are met (such as one or more of the groups of conditions discussed with respect to FIG. 1 above). If not, the flow may proceed to operation 340 and end. Otherwise, at operation 350, the electronic device may determine that a near miss has occurred.

In various examples, this example method 300 may be implemented as a group of interrelated software modules or components that perform various functions discussed herein. These software modules or components may be executed within a cloud network and/or by one or more computing devices, such as the analysis device 101 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as determining that a near miss/collision has occurred. However, it is understood that this is an example. In some implementations, the electronic device may perform one or more actions in response to determining that a near miss/collision has occurred. This may include recording data regarding the near miss/collision, marking the traffic data with one or more near miss/collision indicators, and so on. Various configurations are possible and contemplated without departing from the scope of the present disclosure.

Figure 4:
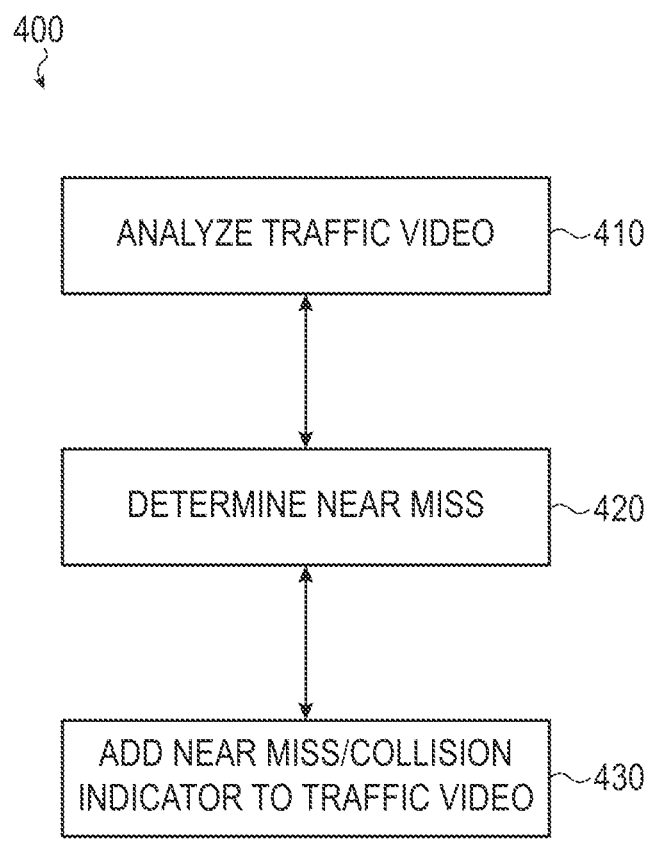
FIG. 4 depicts a flow chart illustrating a third example method for traffic near miss/collision detection. This method may be performed by the system of FIG. 1.

FIG. 4 depicts a flow chart illustrating a third example method for traffic near miss/collision detection. This method may be performed by the system of FIG. 1.

At operation 410, an electronic device (such as the analysis device 101 of FIG. 1) may analyze traffic video. At operation 420, the electronic device may determine that a near miss/collision has occurred. At operation 430, the electronic device may add a near miss/collision indicator to the traffic video.

In various examples, this example method 400 may be implemented as a group of interrelated software modules or components that perform various functions discussed herein. These software modules or components may be executed within a cloud network and/or by one or more computing devices, such as the analysis device 101 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as analyzing traffic video. However, it is understood that this is an example. In some implementations, other traffic data, such as point cloud data from one or more LIDAR sensors, may instead be analyzed. Various configurations are possible and contemplated without departing from the scope of the present disclosure.

Figure 5A:
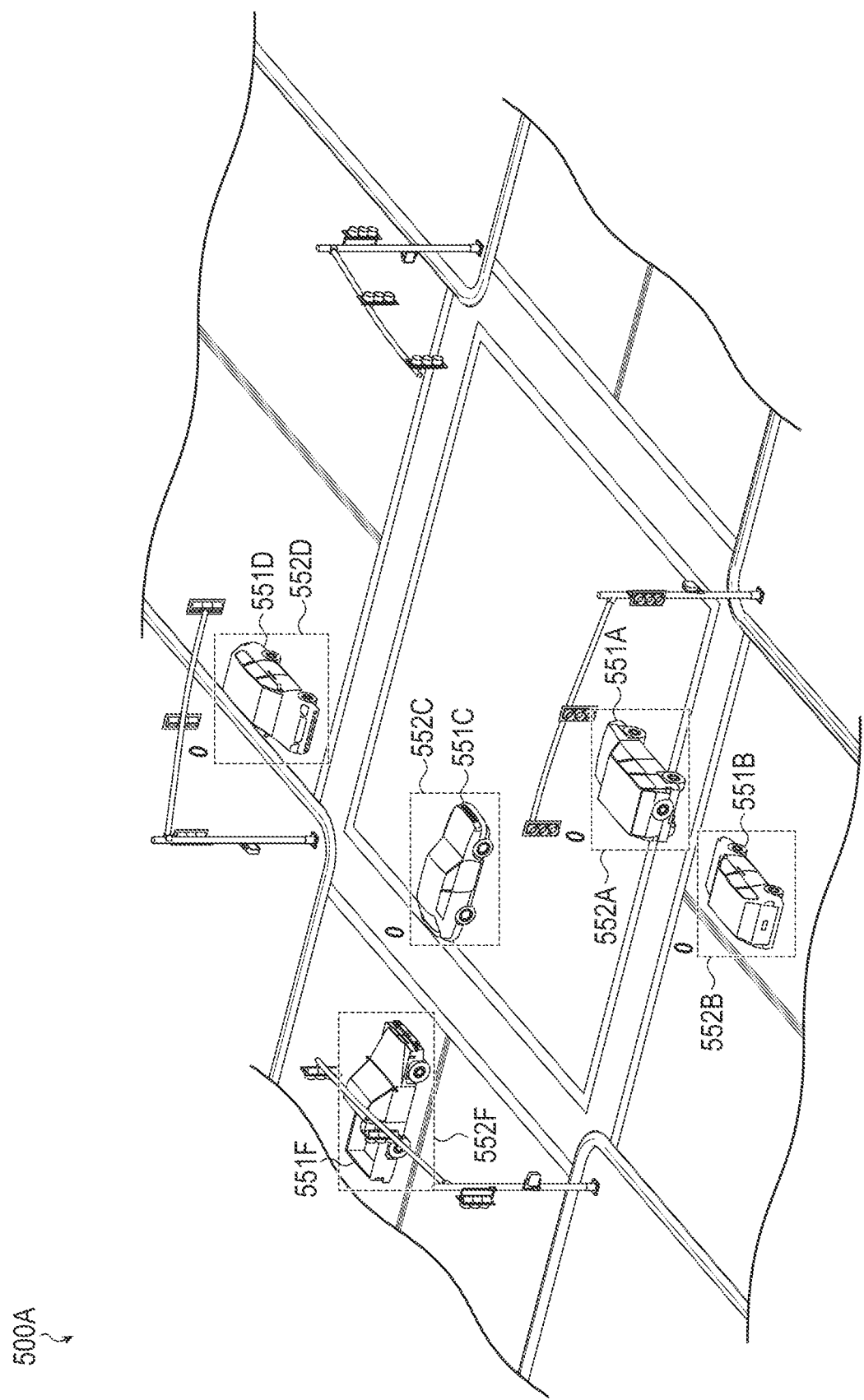
FIG. 5A depicts a first frame of traffic data video.
Figure 5B:
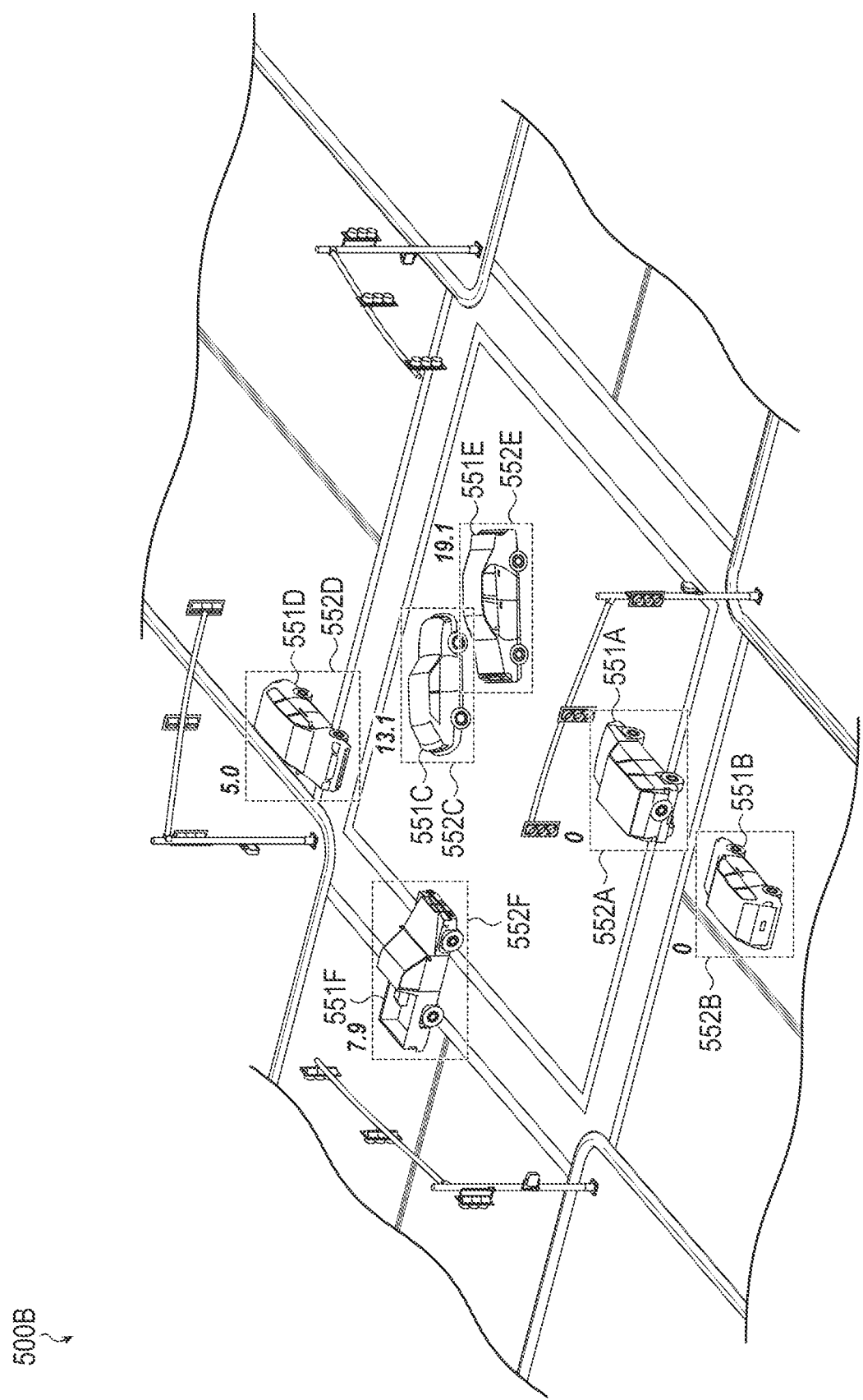
FIG. 5B depicts a second frame of traffic data video.
Figure 5C:
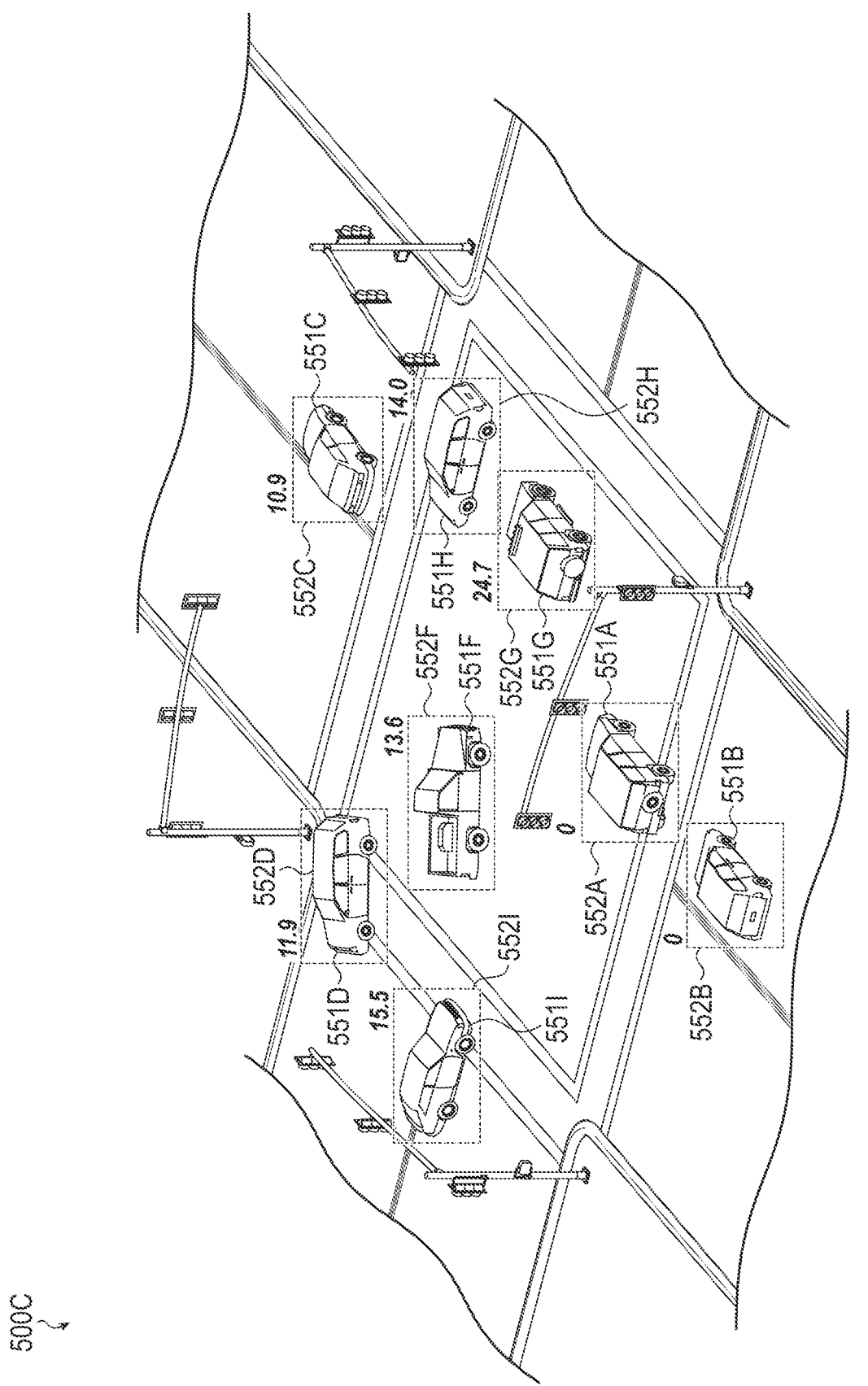
FIG. 5C depicts a third frame of traffic data video.

FIG. 5A depicts a first frame 500A of traffic data video. As shown, the objects 551A-551D, 551F in the first frame 500A each includes an indicator 552A-552D, 552F that indicates that each of the objects 551A-551D, 551F has not been involved in a near miss/collision. As illustrated, the indicators 552A-552D, 552F may be in dashed lines to show that each of the objects 551A-551D, 551F has not been involved in a near miss/collision. However, it is understood that this is an example. In other examples, the indicators 552A-552D, 552F may be green to show that the objects 551A-551D, 551F have not been involved in a near miss/collision. In still other examples, other indicators 552A-552D, 552F may be used without departing from the scope of the present disclosure. FIG. 5B depicts a second frame 500B of traffic data video. The second frame 500B may be a subsequent frame to the first frame 500A of FIG. 5A. Similar to FIG. 5A, the objects 551A-551F in the second frame 500B each includes an indicator 552A-552F that indicates that each of the objects 551A-551F has not been involved in a near miss/collision. FIG. 5C depicts a third frame 500C of traffic data video. The third frame 500C may be a subsequent frame to the second frame 500B of FIG. 5B. Similar to FIGS. 5A and 5B, the objects 551A-551D, 551F-551I in the third frame 500C each includes an indicator 552A-552D, 552F-552I that indicates that each of the objects 551A-551D, 551F-551I has not been involved in a near miss/collision. However, unlike FIGS. 5A and 5B, two of the objects 551G, 551H in the intersection are about to have a near miss.

Figure 5D:
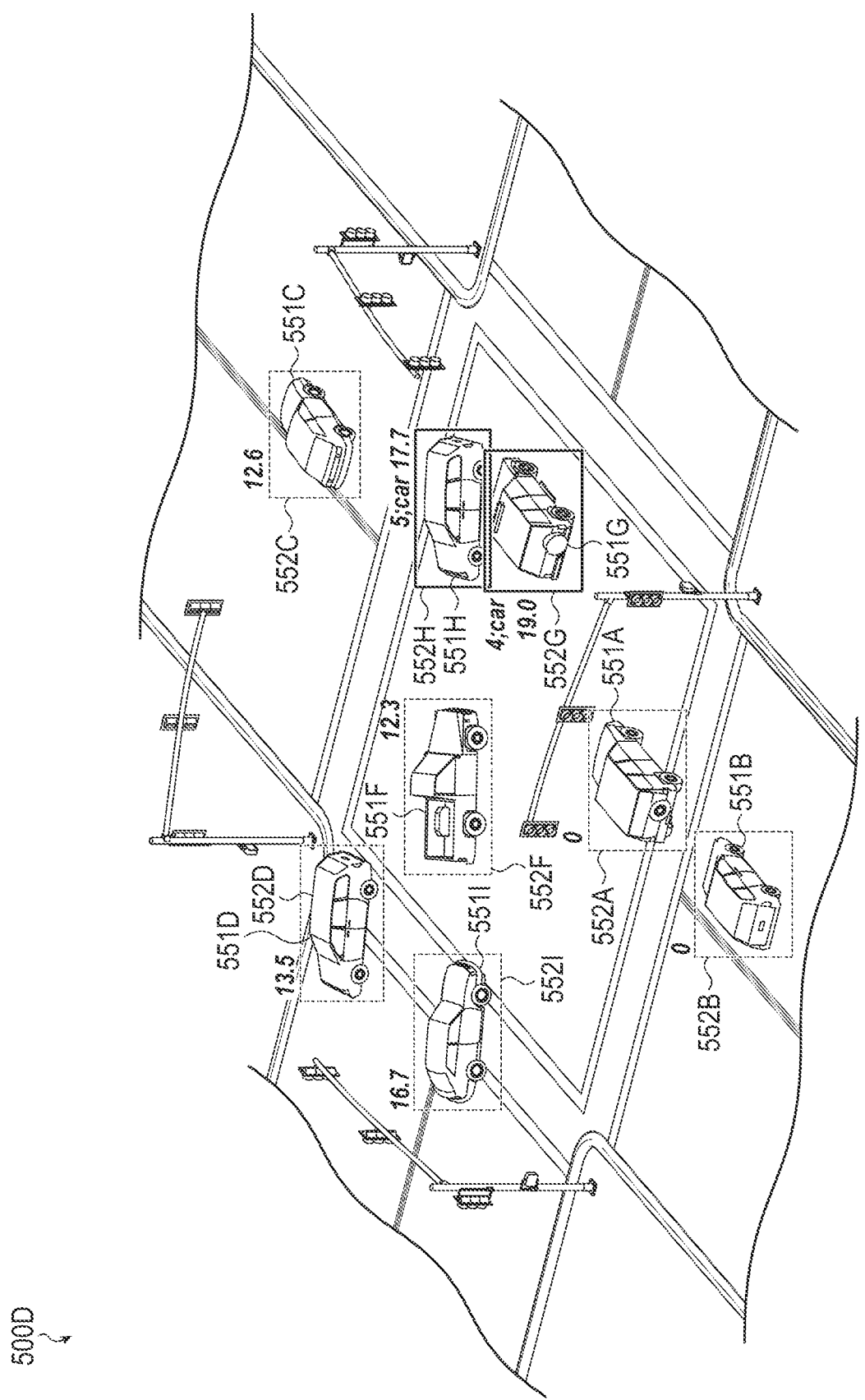
FIG. 5D depicts a fourth frame of traffic data video.

FIG. 5D depicts a fourth frame 500D of traffic data video. The fourth frame 500D may be a subsequent frame to the third frame 500C of FIG. 5C. As mentioned above, the two objects 551G, 551H in the intersection have proceeded and are involved in a near miss. As such, the indicators 552G, 552H for those two objects 551G, 551H that previously indicated that the two objects 551G, 551H had not been involved in a near miss have been modified to indicate that the two objects 551G, 551H have been involved in a near miss. However, it is understood that this is an example. In other implementations, the indicators 552G, 552H for those two objects 551G, 551H that previously indicated that the two objects 551G, 551H had not been involved in a near miss may instead be removed and other indicators 552G, 552H indicating that the two objects 551G, 551H have been involved in a near miss may be added. Various configurations are possible and contemplated without departing from the scope of the present disclosure.

As illustrated, the indicators 552G-552H may be in solid lines to show that the objects 551G, 551H have been involved in a near miss. However, it is understood that this is an example. In other examples, the indicators 552G, 552H may be red to show that the objects 551G, 551H have been involved in a near miss/collision. In still other examples, other indicators 552G, 552H may be used without departing from the scope of the present disclosure.

Figure 5E:
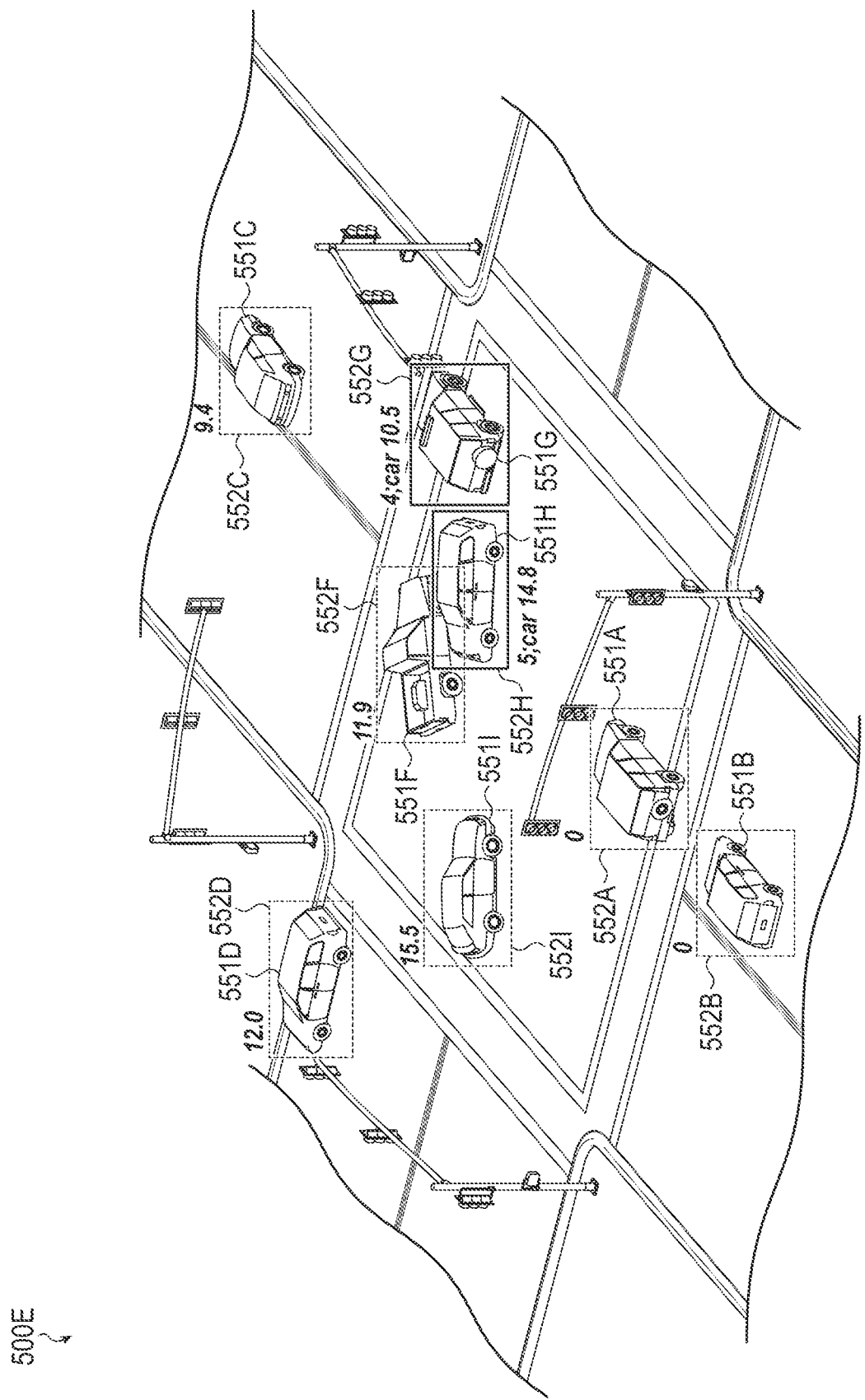
FIG. 5E depicts a fifth frame of traffic data video.

FIG. 5E depicts a fifth frame 500E of traffic data video. The fifth frame 500E may be a subsequent frame to the fourth frame 500D of FIG. 5D. As shown, the indicators 552G, 552H for the two objects 551G, 551H that were involved in the near miss in FIG. 5D still indicate that the two objects 551G, 551H were involved in a near miss.

Although FIGS. 5A-5E are illustrated and discussed above with respect to a near miss, it is understood that this is an example. In various implementations, the present disclosure may detect and respond to collisions between objects 551A-551D, 551F-551I instead of and/or in addition to detecting and responding to near misses. Collisions may be detected and responded to similarly to how near misses are detected and responded to in the present disclosure. Various configurations are possible and contemplated without departing from the scope of the present disclosure.

Although FIGS. 5A-5E are illustrated and discussed above with respect to particular traffic data, objects, frames, and indicators, it is understood that these are examples. In various implementations, other traffic data, objects, frames, indicators, and so on may be used without departing from the scope of the present disclosure.

In various implementations, frames of a raw, real-time video feed from an intersection camera and/or other traffic data may be obtained (though it is understood that this is an example and that in other examples other data, such as point cloud LiDAR data, may be obtained and used). Detection and classification may be performed on each frame to identify and classify the objects in the frame. Structured data may then be determined for the objects detected. For example, a frame number may be determined for a frame, an intersection identifier may be determined for a frame, a unique tracker identifier may be assigned to each object detected, the class of the object may be determined (such as person, car, truck, bus, motorbike, bicycle, and so on), coordinates of the object detected in the frame may be determined (which may be determined with reference to known coordinates of the intersection and/or the intersection camera, such as camera longitude, latitude, city, state, country, and so on) (such as the minimum and maximum x positions of the object, the minimum and maximum y positions of the object, and so on), and the like.

Various metrics may be calculated from the structured data mentioned above. For example, a bounding box may be calculated for the object based on one or more x and/or y positions for the object. By way of another example, one or more geometric centers of the object's bounding box may be calculated for the object in the x and/or y coordinate (such as an x min, a y min, and so on). By way of still another example, an intersection approach that the object is currently on may be calculated, such as based on a position of the object and a position of the center of the intersection.

Further, other structured data may be determined from the frames. For example, one or more time stamps associated with frames may be determined and/or associated with other structured data, such as to determine a time at which an object was at a determined x and/or y position. By way of another example, a light phase for the frame may be determined (such as whether a traffic light in the frame is green, red, and so on), though this may instead be determined by means other than image analysis (such as time-stamped traffic light data that may be correlated to a frame time stamp). This may be used to determine the traffic light phase when an object arrived at the intersection, such as by correlating a traffic light phase determined for a frame along with a determination that an object arrived at the intersection in the frame. In yet another example, data for an approach and/or intersection associated with a frame may be determined (such as based on a uniform resource locator of the video feed and/or any other intersection camera identifier associated with the frame, an approach identifier associated with the frame, an intersection identifier associated with the frame, and so on).

The structured data determined for an object in a frame may be used with the structured data determined for the object in other frames to calculate various metrics. For example, the difference between one or more x and/or y positions for the object (such as the difference and/or distance between x or y midpoints of the object's bounding box) in different frames (such as in a current and a previous frame) may be calculated. Such difference in position between frames, along with times respectively associated with the frames (such as from one or more time stamps) may be used to calculate one or more metrics associated with the speed of the object (such as an average speed of the object during the video feed (such as in miles per hour and/or other units), cumulative speed, and so on). Such difference in position between frames may also be used to calculate various metrics about the travel of the object (such as the direction of travel between frames, how the object left an intersection, whether or not the object made a right on red, and so on). By way of another example, structured data from multiple frames may be used to determine a status of the object (such as an approach associated with the object, how an object moved through an intersection, an approach an object used to enter an intersection, the approach an object used to exit an intersection, and so on), a time or number of frames since the object was last detected (and/or since first detected and so on), whether or not the object is moving, and so on.

Structured data and/or metrics for individual detected objects and/or other data (such as light phase, time, intersection position, and so on) determined using one or more frames and/or from one or more video feeds from one or more intersection cameras associated with one or more intersections may be used together to calculate various metrics, such as metrics associated with approaches. For example, structured data and/or metrics for individual detected objects associated with an approach identifier (which may be determined based on an association with the intersection camera from which frames of the video feed were obtained) may be aggregated and analyzed to determine one or more approach volumes (such as a number of vehicles (cars, motorbikes, trucks, buses, and so on)) in a particular approach, a number of light vehicles (such as cars, motorbikes, and so on) in a particular approach, a number of heavy vehicles (such as trucks, buses, and so on) in a particular approach, a number of cars in a particular approach, a number of trucks in a particular approach, a number of buses in a particular approach, a number of pedestrians in a particular approach, a number of non-motor vehicles in a particular approach, a number of bicycles in a particular approach, and so on), an average queue length (such as in feet and/or another unit of measurement) of a particular approach, and so on. By way of another example, light status in one or more frames may be tracked and/or correlated with other information to determine a light status, an effective green time (such as a length of time that objects are moving through a particular intersection), an effective red time (such as a length of time that objects are stopped at a particular intersection), a cycle time (such as a length of time that a light is green determined by comparing the light phase across multiple frames), a number of cars that arrived while a traffic light is green, a number of cars that arrived while a traffic light is red, a measure of individual phase progression performance derived from a percentage of vehicle volume arrivals on green, and so on.

Other structured data and/or metrics associated with approaches may be calculated. For example, a last stop time may be calculated based on a last time stamp that an object stopped at an approach. By way of another example, a last start time may be calculated based on a last time stamp that an object moved into the intersection at a particular approach. In other examples, an approach identifier for a particular approach may be determined, coordinates for a camera associated with a particular intersection may be determined, a number of lanes associated with a particular approach may be determined, and so on.

Structured data and/or metrics for individual detected objects and/or other data (such as light phase, time, intersection position, and so on) determined using one or more frames and/or from one or more video feeds from one or more intersection cameras associated with one or more intersections may be also used together to calculate various metrics associated with intersections. For example, a vehicle volume for a particular intersection may be determined by summing objects (such as cars, motorbikes, trucks, buses, and so on) in all approaches of a frame associated with the intersection, a light vehicle volume for a particular intersection may be determined by summing objects (such as cars, motorbikes, and so on) in all approaches of a frame associated with the intersection, a heavy vehicle volume for a particular intersection may be determined by summing objects (such as trucks, buses, and so on) in all approaches of a frame associated with the intersection, a car volume for a particular intersection may be determined by summing cars in all approaches of a frame associated with an intersection, a truck volume for a particular intersection may be determined by summing trucks in all approaches of a frame associated with an intersection, a bus volume for a particular intersection may be determined by summing buses in all approaches of a frame associated with an intersection, a person volume for a particular intersection may be determined by summing people in all approaches of a frame associated with an intersection, a bicycle volume for a particular intersection may be determined by summing bicycles in all approaches of a frame associated with an intersection, arrivals on green in all approaches of a frame associated with an intersection, arrivals on red in all approaches of a frame associated with an intersection, a number of near misses in a frame associated with a particular intersection (which may be calculated based on positions of objects in the frame, such as based on the distance between the geometric centers of the bounding boxes associated with two objects being less than a threshold), a current frame when a light went red, a frame when a light went green, and so on.

Other information for an intersection may be determined using the video feed, frames, and/or other structured data and/or metrics. For example, an identifier for a camera associated with an intersection may be determined, identifiers for frames of one or more video feeds associated with the intersection may be determined, observation times associated with an intersection may be determined (such as a time stamp based on ingestion time when other metadata from a stream or other video feed is not available, a cumulative time (such as from the start of processing of the video feed) may be determined, and so on.

Further, the above raw data, structured data, metrics, and so on may be used to detect one or more near misses/collisions. Detection of such near misses/collisions may be performed using one or more of the methods and/or procedures discussed above.

Although determination and calculation of structured data and/or metrics relating to one or more vehicles and/or other objects, approaches, intersections, and so on are discussed above, it is understood that these are examples. In various examples, any structured data and/or metrics relating to one or more vehicles and/or other objects, approaches, intersections, and so on may be determined and calculated from the objects detected in one or more frames of one or more video feeds of one or more intersection cameras and/or other traffic data without departing from the scope of the present disclosure.

Alternatively and/or additionally to determining and/or calculating structured data and/or metrics from one or more video feeds from one or more intersection cameras and/or other traffic data, connected vehicle data may be obtained and used. For example, structured data and/or metrics may be determined and/or calculated using a combination of connected vehicle data and data from one or more video feeds from one or more intersection cameras and/or other traffic data. By way of another example, a visualization dashboard may visualize connected vehicle data along with structured data and/or metrics determined and/or calculated from one or more video feeds from one or more intersection cameras and/or other traffic data.

To summarize the above, real-time video feed from an intersection camera and/or other traffic data may be obtained. Objects in frames of the video feed may be detected and classified. Positions of the objects at various times in the frames of the video feed may be determined, as well as information such as light statuses related to the objects. Differences between the objects in different frames may be used to determine behavior of the objects over time. Such calculated object metrics may be stored, such as in one or more vehicle tables. Such calculated object metrics for objects that are associated with a particular approach may be aggregated in order to determine various approach object volumes and/or other metrics related to the approach, which may then be stored, such as in one or more approach tables. Further, such object metrics for objects that are associated with a particular intersection may be aggregated in order to determine various intersection object volumes and/or other metrics related to the intersection, which may then be stored, such as in one or more intersection tables.

The above structured data and/or metrics related to one or more vehicles and/or other objects, approaches, intersections, and so on discussed above may then be processed and/or otherwise prepared for visualization and/or one or more other purposes, such as near miss/collision detection. For example, structured data and/or metrics related to one or more vehicles and/or other objects may be stored in one or more vehicle tables, structured data and/or metrics related to one or more intersections may be stored in one or more intersection tables, structured data and/or metrics related to one or more approaches may be stored in one or more approach tables, and so on. Such tables may then be used for visualization and/or one or more other purposes.

Although the above illustrates and describes performance of functions (such as detection and classification, determination of structured data, near miss/collision detection, and so on) on frames of a raw, real-time video feed from an intersection camera and/or other traffic data, it is understood that this is an example. In various implementations, one or more such functions (and/or other functions) may be performed on other traffic data, such as data from one or more LiDAR sensors.

LiDAR sensors may be operable to determine data, such as ranges (variable distance), by targeting an object with elements, such as one or more lasers, and measuring the time for the reflected light to return to one or more receivers. LiDAR sensors may generate point cloud data that may be used for the analysis discussed herein instead of frames of a raw, real-time video feed from an intersection camera and/or other traffic data.

In some examples, functions similar to those described above performed on frames of a raw, real-time video feed from an intersection camera and/or other traffic data (such as detection and classification, determination of structured data, near miss/collision detection, and so on) may be performed on the LiDAR sensor data. In other examples, structured data generated from LiDAR cloud data that has already been detected and classified may be obtained and various metrics may be calculated from such, similar to above, which may then be prepared for visualization and/or visualized and/or otherwise used similar to above.

LiDAR sensor data may have a number of advantages over frames of a raw, real-time video feed from an intersection camera and/or other traffic data. To begin with, point cloud data from one or more LiDAR sensors may not have the same privacy issues as frames of a raw, real-time video feed from an intersection camera and/or other traffic data as facial and/or other similar images may not be captured. Further, LiDAR sensor data may not be dependent on lighting and thus may provide more reliable data over all times of day and night as compared to frames of a raw, real-time video feed from an intersection camera and/or other traffic data. Additionally, LiDAR sensor data may provide data in three-dimensional space as opposed to the two-dimensional data from frames of a raw, real-time video feed from an intersection camera and/or other traffic data and thus may provide depth, which may not be provided via frames of a raw, real-time video feed from an intersection camera and/or other traffic data.

For example, a determination may be made about the size of an average vehicle in pixels. This may be used with the LiDAR sensor data to determine the pixels from the center of a vehicle represented in the LiDAR sensor data and then infer the speed of the vehicle. Compared to approaches using frames of a raw, real-time video feed from an intersection camera and/or other traffic data, an assumption may not have to be made about object speed. This may be more accurate, but also may improve the processing speed of computing devices processing the data as functions performed on frames of a raw, real-time video feed from an intersection camera and/or other traffic data to determine speed may not need to be performed and can be omitted since this information may already be represented in LiDAR sensor data. Various configurations are possible and contemplated without departing from the scope of the present disclosure.

In various implementations, a system may include a memory allocation configured to store at least one executable asset and a processor allocation configured to access the memory allocation and execute the at least one executable asset to instantiate a near miss/collision detection service. The near miss/collision detection service may detect objects in a frame, analyze pairs of the objects, determine that a group of conditions are met, and determine that a near miss/collision has occurred.

In some examples, the group of conditions may include that a distance between an object pair of the pairs of the objects is less than a distance threshold. In a number of such examples, the distance threshold may be approximately 7 feet. By way of illustration, approximately 7 feet may be within 6-8 feet.

In various examples, the group of conditions may include that a speed of an object of an object pair of the pairs of the objects is greater than a speed threshold. In some such examples, the speed threshold may be approximately zero miles per hour. By way of illustration, approximately zero may be within 1 mile per hour of zero.

In a number of examples, the group of conditions may include that an angle between an object pair of the pairs of the objects is higher than an angle threshold. In some such examples, the angle threshold may be approximately 12 degrees. By way of illustration, approximately 12 degrees may be within 11-13 degrees.

In various examples, the group of conditions may include that an object pair of the pairs of the objects are not both coming from a same approach. In some implementations, the group of conditions may include that one of an object pair of the pairs of the objects was not previously determined to be involved in another near miss/collision. In a number of implementations, the group of conditions may include that a sum of previous speeds is higher than zero for both of an object pair of the pairs of the objects.

In some examples, the group of conditions may include a first group of conditions for a first object pair of the pairs of the objects that are both vehicles and a second group of conditions for a second object pair of the pairs of the objects that include a vehicle and a pedestrian. In a number of such examples, the second group of conditions may include a lower distance threshold than the first group of conditions. In various such examples, the second group of conditions may include no condition related to an angle between the vehicle and the pedestrian. In some such examples, the second group of conditions may include a higher speed threshold than the first group of conditions and the second group of conditions evaluates the vehicle according to the higher speed threshold.

In a number of examples, the near miss/collision detection service may determine a conversion factor between pixels and a speed measurement. In various such examples, the speed measurement may be in miles per hour. In some examples, the system may further include adding a near miss/collision indicator to the frame.

In some embodiments a method of near miss/collision detection may include obtaining traffic data, analyzing the traffic data, determining that a near miss/collision occurred, and responding to the near miss/collision.

In various examples, responding to the near miss/collision may include determining that the near miss/collision is a collision. In a number of such examples, the method may further include transmitting an alert regarding the collision.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to traffic near miss/collision detection. Traffic data may be obtained, such as video from intersection cameras, point cloud data from LiDAR sensors, and so on. Object detection and classification may be performed using the data, and structured data may be determined and/or output using the detected and classified objects. Alternatively, structured data may be obtained that has been generated by performing such object detection and classification on traffic data (such as point cloud data from LiDAR sensors). Metrics may be calculated using the structured data. For each frame of traffic data, the metrics may be analyzed to detect whether a near miss/collision occurs between each object in the frame (such as motorized or non-motorized vehicles, pedestrians, and so on) and each of the other objects in the frame. These metrics may be analyzed to evaluate whether or not a group of conditions are met. If the group of conditions are met, a near miss/collision may be detected. This may be recorded in the metrics for the objects involved. In some implementations, one or more indicators may be added to the traffic data and/or to one or more visualizations generated using the metrics, the traffic data, the structured data, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system, comprising:
   a non-transitory memory allocation configured to store at least one executable asset; and
   a non-transitory processor allocation configured to access the memory allocation and execute the at least one executable asset to instantiate:
   a near miss/collision detection service that:
      detects objects in a frame;
      analyzes pairs of the objects;
      determines that a group of conditions are met; and
      determines that a near miss/collision has occurred;
   wherein:
   the group of conditions includes that a distance between an object pair of the pairs of the objects is less than a distance threshold;
   the group of conditions includes:
      a first group of conditions for a first object pair of the pairs of the objects that are both vehicles; and
      a second group of conditions for a second object pair of the pairs of the objects that include a vehicle and a pedestrian; and
   the second group of conditions includes no condition related to an angle between the vehicle and the pedestrian.

2. The system of claim 1, wherein the group of conditions includes that a speed of an object of an object pair of the pairs of the objects is greater than a speed threshold.

3. The system of claim 2, wherein the speed threshold is approximately zero miles per hour.

4. The system of claim 1, wherein the group of conditions includes that an angle between an object pair of the pairs of the objects is higher than an angle threshold.

5. The system of claim 4, wherein the angle threshold is approximately 12 degrees.

6. The system of claim 1, wherein the group of conditions includes that an object pair of the pairs of the objects are not both coming from a same approach.

7. The system of claim 1, wherein the group of conditions includes that one of an object pair of the pairs of the objects was not previously determined to be involved in another near miss/collision.

8. The system of claim 1, wherein the group of conditions includes that a sum of previous speeds is higher than zero for both of an object pair of the pairs of the objects.

9. The system of claim 1, wherein the second group of conditions includes a lower distance threshold than the first group of conditions.

10. The system of claim 1, wherein:
    the second group of conditions includes a higher speed threshold than the first group of conditions; and
    the second group of conditions evaluates the vehicle according to the higher speed threshold.

11. The system of claim 1, wherein the near miss/collision detection service determines a conversion factor between pixels and a speed measurement.

12. The system of claim 11, wherein the speed measurement comprises miles per hour.

13. The system of claim 1, further comprising adding a near miss/collision indicator to the frame.

14. A system, comprising:
    a non-transitory memory allocation configured to store at least one executable asset; and
    a non-transitory processor allocation configured to access the memory allocation and execute the at least one executable asset to instantiate:
    a service that:
       detects objects in a frame;
       analyzes pairs of the objects;
       determines that a group of conditions are met; and
       determines that a near miss/collision has occurred;
    wherein:
    the group of conditions includes that a distance between an object pair of the pairs of the objects is less than a distance threshold;
    the group of conditions includes:
       a first group of conditions for a first object pair of the pairs of the objects that are both vehicles; and
       a second group of conditions for a second object pair of the pairs of the objects that include a vehicle and a pedestrian; and
    the second group of conditions includes a lower distance threshold than the first group of conditions.

15. The system of claim 14, wherein the distance threshold is approximately 7 feet.

16. The system of claim 14, wherein:
    the second group of conditions includes a higher speed threshold than the first group of conditions; and
    the second group of conditions evaluates the vehicle according to the higher speed threshold.

17. The system of claim 14, wherein the second group of conditions includes no condition related to an angle between the vehicle and the pedestrian.

18. A method of near miss/collision detection, comprising:
    obtaining traffic data;
    analyzing the traffic data;
       determining that a near miss/collision occurred by evaluating a group of conditions the group of conditions including that a distance between an object pair is less than a distance threshold, the group of conditions including a first group of conditions for a first object pair that are both vehicles and a second group of conditions for a second object pair that includes a vehicle and a pedestrian, the second group of conditions includes a higher speed threshold than the first group of conditions, the second group of conditions evaluates the vehicle according to the higher speed threshold; and responding to the near miss/collision.

19. The method of claim 18, wherein responding to the near miss/collision comprises determining that the near miss/collision is a collision.

20. The method of claim 19, further comprising transmitting an alert regarding the collision.

\* \* \* \* \*